United States Patent
Manda et al.

(10) Patent No.: US 10,774,718 B2
(45) Date of Patent: Sep. 15, 2020

(54) MULTI-NOZZLE DESIGN TO ELIMINATE DOWNSTREAM MIXING DEVICES

(71) Applicant: Caterpillar Inc., Deerfield, IL (US)

(72) Inventors: Ramakrishna V. Manda, Dunlap, IL (US); Kevin L. Martin, Washburn, IL (US); Paul A. Zwart, Dunlap, IL (US); Andrew M. Denis, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 45 days.

(21) Appl. No.: 16/176,788

(22) Filed: Oct. 31, 2018

(65) Prior Publication Data

US 2020/0131968 A1    Apr. 30, 2020

(51) Int. Cl.
*F01N 3/20* (2006.01)
*F01N 3/28* (2006.01)
*F01N 13/08* (2010.01)

(52) U.S. Cl.
CPC ......... *F01N 3/2892* (2013.01); *F01N 3/2066* (2013.01); *F01N 13/08* (2013.01); *F01N 2610/02* (2013.01); *F01N 2610/08* (2013.01); *F01N 2610/146* (2013.01); *F01N 2610/1453* (2013.01)

(58) Field of Classification Search
CPC .. F01N 3/2066; F01N 3/2892; F01N 2610/02; F01N 2610/08; F01N 2610/1453; F01N 2610/146
USPC .......................................................... 60/324
See application file for complete search history.

(56) References Cited

U.S. PATENT DOCUMENTS

| | | | |
|---|---|---|---|
| 3,702,619 A * | 11/1972 | Son ....................... | B01F 5/0456 137/3 |
| 6,449,947 B1 | 9/2002 | Liu et al. | |
| 9,551,255 B2 * | 1/2017 | Kelso .................... | B01F 5/0606 |
| 10,392,989 B1 * | 8/2019 | Tucker ............... | B01D 53/9431 |
| 10,473,013 B2 * | 11/2019 | Mitchell ................ | F01N 3/208 |
| 2007/0193255 A1 | 8/2007 | Satou | |
| 2008/0060352 A1 * | 3/2008 | Jozsa .................. | B01F 3/04021 60/299 |
| 2008/0193353 A1 | 8/2008 | Hirschberg | |

(Continued)

FOREIGN PATENT DOCUMENTS

| CN | 103133430 | 6/2013 |
|---|---|---|
| CN | 103962023 | 8/2014 |

(Continued)

OTHER PUBLICATIONS

"International Application Serial No. PCT/US2019/056659, International Search Report dated Feb. 12, 2020", 3 pgs.

(Continued)

*Primary Examiner* — Audrey K Bradley
(74) *Attorney, Agent, or Firm* — Schwegman, Lundberg & Woessner

(57) ABSTRACT

An injection apparatus includes an injection mixing platform located within an exhaust pipe; wherein the injection mixing platform includes two or more mixing blades extending radially from a common central hub, at least one of the mixing blades being coupled to a DEF inlet to receive DEF from an external tank, wherein each of the two or more mixing blades includes at least one nozzle to eject the DEF into an exhaust stream, the two or more mixing blades being statically mounted to an inner surface of the exhaust pipe.

18 Claims, 3 Drawing Sheets

(56) References Cited

U.S. PATENT DOCUMENTS

| | | | |
|---|---|---|---|
| 2011/0016851 A1 | 1/2011 | Oriet et al. | |
| 2011/0219745 A1* | 9/2011 | Griffin | B01F 3/04049 |
| | | | 60/274 |
| 2012/0096838 A1* | 4/2012 | Sandberg | B01F 3/04049 |
| | | | 60/274 |
| 2014/0053538 A1* | 2/2014 | Reeves | F01N 3/00 |
| | | | 60/286 |
| 2015/0121855 A1* | 5/2015 | Munnannur | F01N 3/2066 |
| | | | 60/295 |
| 2016/0108789 A1* | 4/2016 | Mitchell | F01N 3/225 |
| | | | 60/602 |
| 2018/0149060 A1* | 5/2018 | Hehle | F01N 3/2892 |
| 2019/0316509 A1* | 10/2019 | Halldorf | F01N 3/208 |

FOREIGN PATENT DOCUMENTS

| | | |
|---|---|---|
| CN | 106948909 | 7/2017 |
| CN | 108005762 | 5/2018 |
| DE | 102006055655 | 5/2008 |
| KR | 20170027525 | 3/2017 |

OTHER PUBLICATIONS

"International Application Serial No. PCT/US2019/056659, Written Opinion dated Feb. 12, 2020", 5 pgs.

* cited by examiner

MULTI-NOZZLE DESIGN TO ELIMINATE DOWNSTREAM MIXING DEVICES

TECHNICAL FIELD

This disclosure relates to exhaust systems for engines, and more specifically to introducing diesel exhaust fluid into the exhaust stream.

BACKGROUND

For a diesel engine, a selective catalytic reduction (SCR) system is used to reduce NOx in the exhaust. This is accomplished by introducing a urea mixture called diesel exhaust fluid (DEF) into the exhaust stream before the exhaust stream reaches a catalyst. SCR systems function best when the DEF is mixed properly into the exhaust stream.

SUMMARY

In an example according to this disclosure, an injection apparatus includes an injection mixing platform located within an exhaust pipe; wherein the injection mixing platform includes two or more mixing blades extending radially from a common central hub, at least one of the mixing blades being coupled to a DEF inlet to receive DEF from an external tank, wherein each of the two or more mixing blades includes at least one nozzle to inject the DEF into an exhaust stream, the two or more mixing blades being statically mounted to an inner surface of the exhaust pipe.

In an example, a system includes an exhaust pipe having an exhaust inlet and an exhaust outlet; an external tank holding DEF which is external to the exhaust pipe; an exhaust treatment system within the exhaust pipe and located before the exhaust outlet; and an injection mixing platform located within the exhaust pipe and between the exhaust inlet and before the exhaust treatment system, wherein the injection mixing platform includes at least two mixing blades having an airfoil shape extending radially from a common central hub, at least one of the mixing blades being coupled to a DEF inlet to receive DEF from the external tank, wherein each of the at least two mixing blades includes at least one nozzle to inject the DEF into an exhaust stream, the at least two blades being statically mounted to an inner surface of the exhaust pipe.

In an example, a method includes injecting DEF into an exhaust stream flowing through an exhaust pipe; and treating the DEF and exhaust stream mixture; wherein the DEF is injected into the exhaust stream by two or more mixing blades located within the exhaust pipe and extending radially from a common central hub, at least one of the mixing blades being coupled to a DEF inlet to receive DEF from an external tank, wherein each of the two or more mixing blades includes at least one nozzle to inject the DEF into the exhaust stream, the two or more mixing blades being statically mounted to an inner surface of the exhaust pipe.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
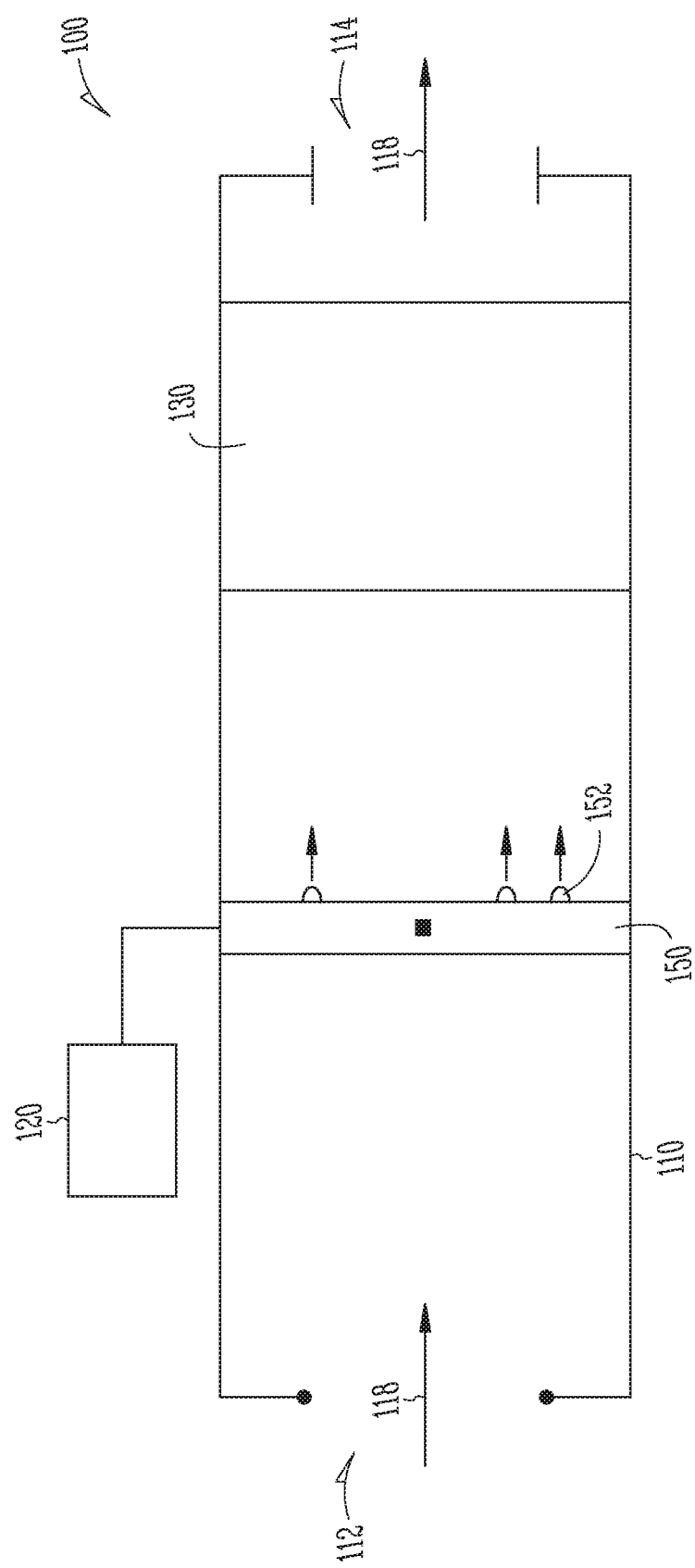
FIG. 1 shows a schematic representation of a selective catalytic reduction system, in accordance with one embodiment.

FIG. 1 shows a schematic representation of a selective catalytic reduction (SCR) system 100, in accordance with one embodiment.

The SCR system 100 generally includes an exhaust pipe 110 having an exhaust inlet 112 and an exhaust outlet 114 through which a diesel exhaust stream 118 flows. The system 100 can include an external tank 120 holding diesel exhaust fluid (DEF). An exhaust treatment system 130 can be located within the exhaust pipe 110 and located before the exhaust outlet 114. The exhaust treatment system 130 can include one or more components such as an SCR catalyst, an oxidation catalyst, or other post-exhaust treatments. The system 100 can include an injection mixing platform 150 located within the exhaust pipe 110 and located between the exhaust inlet 112 and before the exhaust treatment system 130.

The injection mixing platform 150 is connected to the external tank 120 and can include one or more nozzles 152 which inject DEF into the exhaust stream 118.

Figure 2:
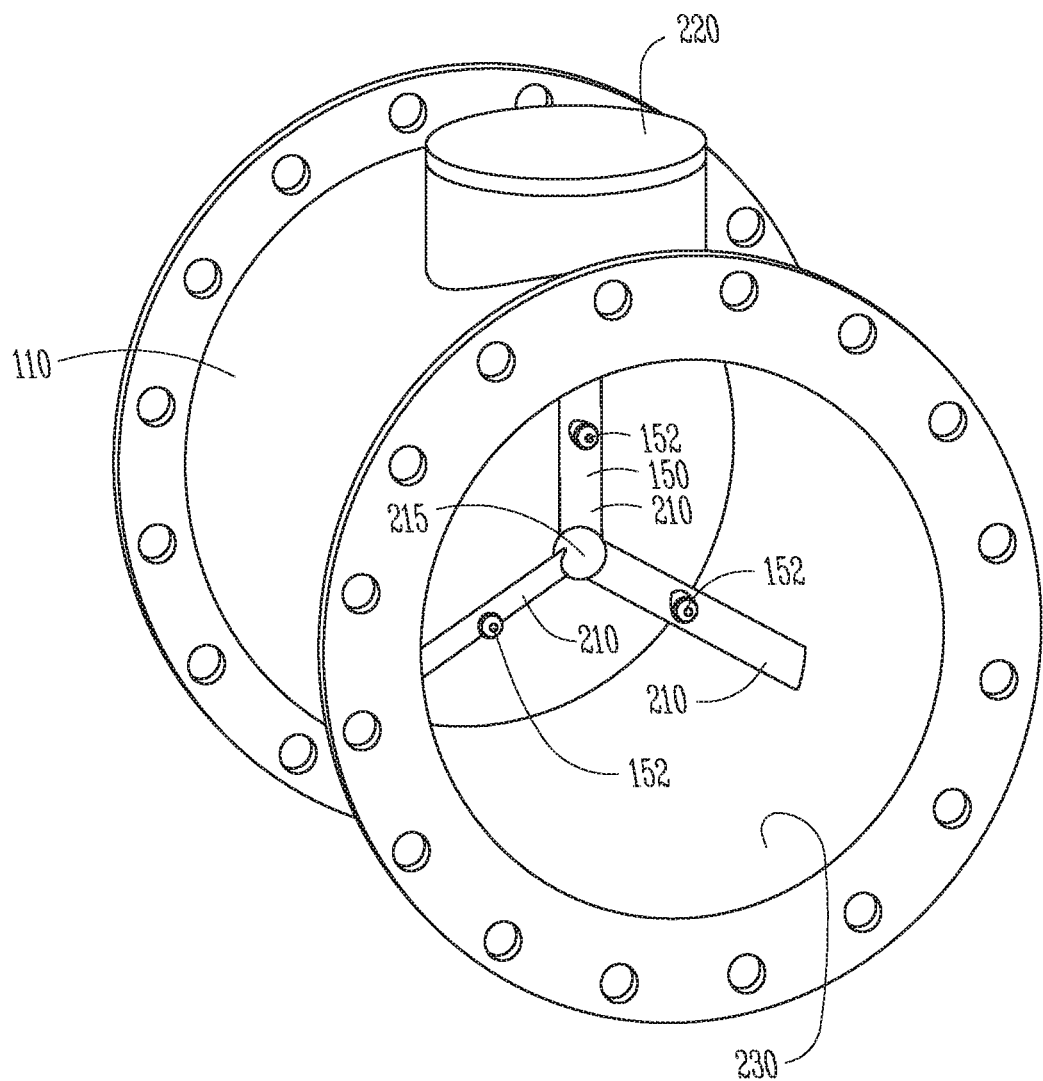
FIG. 2 shows a perspective view of an injection mixing platform, in accordance with one embodiment.
Figure 3:
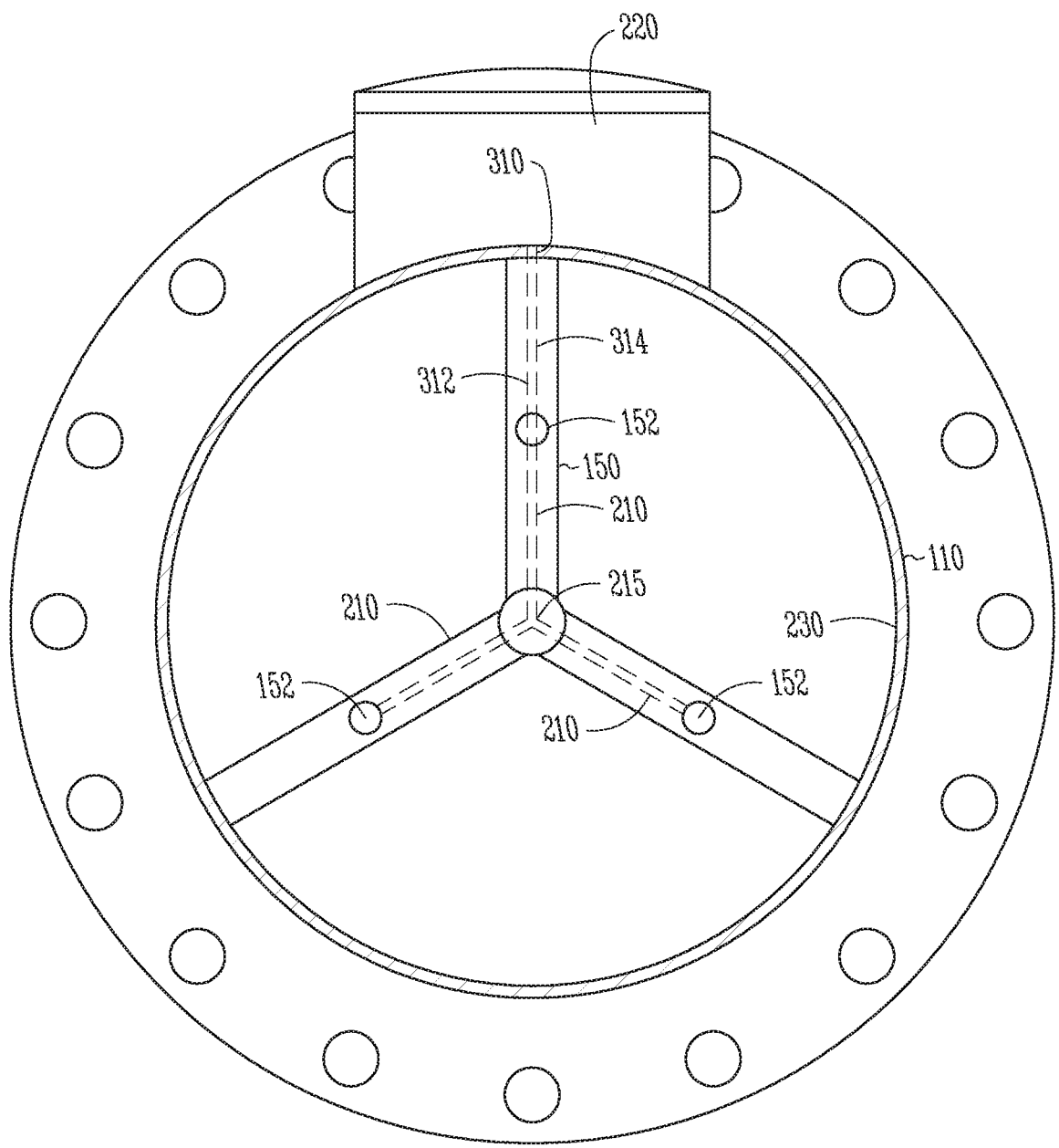
FIG. 3 shows a front view of the injection mixing platform of FIG. 2.

FIGS. 2 and 3 show details of the injection mixing platform 150 with FIG. 2 showing a perspective view of the injection mixing platform 150 and FIG. 3 showing a front view of the injection mixing platform 150, in accordance with one embodiment.

Here, the injection mixing platform 150 is shown inside the exhaust pipe 110. The injection mixing platform 150 includes two or more mixing blades 210 extending radially from a common central hub 215. Each mixing blade 210 extends from the central common hub 215 and is attached at a second end to the inner surface 230 of the exhaust pipe 110. At least one of the mixing blades 210 can be coupled to a DEF inlet 310 to receive DEF from the external tank 120 (FIG. 1). The external tank 120 feeds DEF to an injection controller 220 which delivers air and DEF to each nozzle 152, as will be further discussed below.

As noted, each of the two or more mixing blades 210 includes at least one nozzle 152 to inject the DEF into the exhaust stream. The two or more mixing blades 210 can be statically mounted to the inner surface 230 of the exhaust pipe 110. By being stationary relative to the exhaust pipe 110, the mixing blades 210 impart a swirl to the exhaust stream as the exhaust stream passes by the mixing blades 210.

In one embodiment, the two or more mixing blades 210 can have an airfoil shape. Such a shape at the point of injection of the DEF from nozzles 152 allows the DEF to be mixed into the exhaust at the point of injection. This prevents a concentration of DEF that cannot disperse into the exhaust stream. Further, no further downstream mixing of the exhaust and DEF is needed. For example, past SCR systems can include a downstream baffle to encourage mixing of the DEF with the exhaust stream. Such a baffle is not needed in the present system.

In one example, the injection mixing platform 150 includes at least three mixing blades 210. In one example, the three mixing blades 210 are equidistant from each other and have approximately a 120-degree angle between adjacent mixing blades 210. With the nozzles 152 located at the mid-points of the mixing blades 210, this provides sufficient coverage for the cross-section area of the exhaust pipe 110. Other embodiments provide more than three mixing blades 210.

As seen in FIG. 3, each mixing blade 210 includes a first internal channel 312 to deliver DEF to the nozzles 152 and a second internal channel 314 to deliver air to each of the nozzles 152. The first and second internal channels 312, 314 are independent of each other and the injection controller 220 delivers the proper amounts of DEF and air to each nozzle as devised by the operator based on the velocity of the exhaust stream and the diameter of the exhaust pipe 110, for example. The air and DEF mix at the nozzles 152 and are ejected as an atomized DEF mist into the exhaust stream.

In one embodiment, nozzles 152 can be located approximately equidistant between the common central hub 215 and the inner surface 230 of the exhaust pipe 110. Again, this helps provide sufficient coverage across the cross-sectional area of the exhaust pipe 110. In one example, the nozzles 152 can be swirling nozzles to impart a swirl to the DEF as the DEF is ejected from the nozzle. The swirl of the DEF along with the airfoil causing the exhaust to swirl, and the atomization of the DEF helps provide for the DEF to be properly mixed with the exhaust at the point of injection.

In one example, the mixing blades 210 and nozzles 152 are formed as a single piece using 3-D printing. In one example, the parts of the mixing blades 210 including the internal channels 312, 314 and the nozzles 152 are 3-D printed. In that embodiment, the ends of the blades can be a separately manufactured piece that is then attached to the 3-D printed portion.

INDUSTRIAL APPLICABILITY

The present system is applicable to any diesel exhaust system, but is directed toward large industrial applications, such as large marine, rail, or a large stationary engine. For example, the exhaust pipe 110 can have a diameter of about 12 inches to 20 inches. In an example in accordance with this disclosure, a method of using the system includes injecting DEF into the exhaust stream flowing through the exhaust pipe 110, and then treating the DEF and exhaust stream mixture. The DEF is injected into the exhaust stream by two or more mixing blades 210 located within the exhaust pipe 110 and extending radially from the common central hub 215, with at least one of the mixing blades 210 being coupled to the DEF inlet 310 to receive DEF from the external tank 120. Each of the two or more mixing blades 210 can include at least one nozzle 152 to inject the DEF into the exhaust stream, with the two or more mixing blades 210 being statically mounted to the inner surface 230 of the exhaust pipe 110.

After the DEF is injected into the exhaust stream, the exhaust stream enters the exhaust treatment system 130 and is properly treated.

In other examples, the two or more mixing blades 210 can have an airfoil shape. In some examples, the nozzles 152 are swirling nozzles to impart a swirl to the DEF. The mixing blades 210 having the airfoil shape and the swirling nozzles 152 are configured such that the DEF is thoroughly mixed with the exhaust at the point of injection.

In some past SCR systems, a single point of DEF was added to the exhaust stream. Such single point mixing can create a concentration of DEF that cannot disperse fast enough. A downstream baffle is used to help evaporate and mix the DEF with the exhaust. The present design eliminates the need for a baffle downstream by providing more mixing at the site of injection. For example, by providing multiple nozzles and stationary mixing blades that impart swirl into the exhaust stream at the point of injection.

Various examples are illustrated in the figures and foregoing description. One or more features from one or more of these examples may be combined to form other examples.

The above detailed description is intended to be illustrative, and not restrictive. The scope of the disclosure should, therefore, be determined with references to the appended claims, along with the full scope of equivalents to which such claims are entitled.

What is claimed is:

1. An injection apparatus comprising:
an injection mixing platform located within an exhaust pipe;
wherein the injection mixing platform includes two or more mixing blades extending radially from a common central hub, at least one of the mixing blades being coupled to a DEF inlet to receive DEF from an external tank, wherein each of the two or more mixing blades includes at least one nozzle to inject the DEF into an exhaust stream, the two or more mixing blades being statically mounted to an inner surface of the exhaust pipe, and wherein the two or more mixing blades each have first and second internal channels, the first channel being configured to deliver air to the nozzle, and the second channel being configured to deliver DEF to the nozzle.

2. The injection apparatus of claim 1, wherein the two or more mixing blades have an airfoil shape.

3. The injection apparatus of claim 1, wherein the nozzles are located approximately equidistant between the central hub and the inner surface of the exhaust pipe.

4. The injection apparatus of claim 1, wherein the nozzles are swirling nozzles to impart a swirl to the DEF.

5. The injection apparatus of claim 1, wherein the injection mixing platform includes three mixing blades extending radially from the common central hub.

6. The injection apparatus of claim 5, wherein the three mixing blades are equidistant from each other and have approximately a 120-degree angle between adjacent mixing blades.

7. The injection apparatus of claim 6, wherein the three mixing blades have an airfoil shape.

8. The injection apparatus of claim 7, wherein the nozzles are swirling nozzles to impart a swirl to the DEF.

9. The injection apparatus of claim 8, wherein the mixing blades having the airfoil shape and the swirling nozzles are configured such that the DEF is mixed with the exhaust at the point of injection.

10. A system comprising:
an exhaust pipe having an exhaust inlet and an exhaust outlet;
an external tank holding DEF which is external to the exhaust pipe;
an exhaust treatment system within the exhaust pipe and located before the exhaust outlet; and
an injection mixing platform located within the exhaust pipe and between the exhaust inlet and the exhaust treatment system, wherein the injection mixing platform includes at least two mixing blades having an airfoil shape extending radially from a common central hub, at least one of the mixing blades being coupled to a DEF inlet to receive DEF from the external tank, wherein each of the at least two mixing blades includes at least one nozzle to inject the DEF into an exhaust stream, the at least two mixing blades being statically mounted to an inner surface of the exhaust pipe.

11. The system of claim 10, wherein the at least two mixing blades each have two internal channels to independently deliver air and DEF to the nozzle.

12. The system of claim 10, wherein the nozzles are located approximately equidistant between the central hub and the inner surface of the exhaust pipe.

13. The system of claim 10, wherein the nozzles are swirling nozzles to impart a swirl to the DEF.

14. The system of claim 13, wherein the injection mixing platform includes three mixing blades extending radially from the common central hub, the three mixing blades being equidistant from each other and have approximately a 120-degree angle between adjacent mixing blades.

15. The system of claim 14, wherein the mixing blades having the airfoil shape and the swirling nozzles are configured such that the DEF is mixed with the exhaust at the point of injection.

16. A method comprising:
providing an exhaust pipe having an exhaust stream flowing between an inlet and an exhaust outlet;
supplying DEF from an external tank, which is external to the exhaust pipe, to an injection mixing platform of an exhaust treatment system, the injection mixing platform being within the exhaust pipe and located between the inlet and the exhaust outlet, and including supplying the DEF to a DEF inlet of the injection mixing platform;
injecting DEF into the exhaust stream flowing through the exhaust pipe to create a DEF and exhaust stream mixture by:
supplying the DEF from the DEF inlet along two or more mixing blades having an airfoil shape and located within the exhaust pipe and extending radially from a common central hub, the two or more mixing blades being statically mounted and extending from the central hub toward an inner surface of the exhaust pipe,
supplying air along the two or more mixing blades, and
injecting a mix of the DEF and the air into the exhaust stream from at least one nozzle disposed on each of the two or more mixing blades; and
treating the DEF and exhaust stream mixture.

17. The method of claim 16, wherein the nozzles are swirling nozzles to impart a swirl to the DEF.

18. The method of claim 17, wherein the swirling nozzles are configured such that the DEF is mixed with the exhaust at the point of injection.

* * * * *